United States Patent
Maeda

(10) Patent No.: US 7,933,853 B2
(45) Date of Patent: Apr. 26, 2011

(54) COMPUTER-READABLE RECORDING MEDIUM, APPARATUS AND METHOD FOR CALCULATING SCALE-PARAMETER

(75) Inventor: Kazuho Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 785 days.

(21) Appl. No.: 11/981,226

(22) Filed: Oct. 31, 2007

(65) Prior Publication Data

US 2008/0120263 A1 May 22, 2008

(30) Foreign Application Priority Data

Nov. 20, 2006 (JP) .................................. 2006-313060

(51) Int. Cl.
*G06N 5/02* (2006.01)
(52) U.S. Cl. ...................................................... 706/46
(58) Field of Classification Search .................. 706/60, 706/45, 46; 341/107, 50, 51
See application file for complete search history.

(56) References Cited

U.S. PATENT DOCUMENTS 6,388,592 B1 * 5/2002 Natarajan ..................... 341/107
6,418,425 B1   7/2002 Maeda et al.

FOREIGN PATENT DOCUMENTS

JP           3762840         1/2006

OTHER PUBLICATIONS

Jain, Anil, K, et al, "Statistical Pattern Recognition: A Review", IEEE Transactions on Pattern Analysis and Machine Intelligence, vol. 22, No. 1, Jan. 2000.*

* cited by examiner

*Primary Examiner* — Donald Sparks
*Assistant Examiner* — Ola Olude-Afolabi
(74) *Attorney, Agent, or Firm* — Greer, Burns & Crain, Ltd.

(57) ABSTRACT

The scale-parameter calculating program implements a method of calculating scale parameters, each of which is for use in normalization of a distribution of values of each of explanatory variables in calculation of inter-explanatory variable distances, to predict a value of a objective variable of an unknown case by extracting one or more known cases similar to the unknown case from known cases based on inter-case distances. The inter-case distances is obtained based on the inter-explanatory distances, each of the inter-explanatory variable distances is a distance between each of the known cases and the unknown case taken for each of explanatory variables, each of the cases includes the explanatory variables each expressed by a numerical value and the objective variable expressed by a character string. Each of the known cases is a case that has a known objective variable value while the unknown case has an unknown objective variable value.

11 Claims, 13 Drawing Sheets

FIG.1A

KNOWN CASE SET

| DATA NAME | "I"TH EXPLAN-ATORY VARIABLE | ..... | "j"TH EXPLAN-ATORY VARIABLE | ..... |
|---|---|---|---|---|
| 1 | a (1,1) | ..... | a (1,j) | ..... |
| ⋮ | ⋮ | ..... | ⋮ | ..... |
| i | a (i,1) | ..... | a (i,j) | ..... |
| ⋮ | ⋮ | ..... | ⋮ | ..... |
| n | a (n,1) | ..... | a (n,j) | ..... |
| MEAN VALUE | $\mu$ (1) | ..... | $\mu$ (j) | ..... |
| STANDARD DEVIATION VALUE | $\sigma$ (1) | ..... | $\sigma$ (j) | ..... |

{ RESPONSE VARIABLE VALUES ARE KNOWN } — rows 1 through n

FIG.1B

UNKNOWN CASE SET

| DATA NAME | "I"TH EXPLAN-ATORY VARIABLE | ..... | "j"TH EXPLAN-ATORY VARIABLE | ..... |
|---|---|---|---|---|
| 1 | b (1,1) | ..... | b (1, j) | ..... |
| ⋮ | ⋮ | ..... | ⋮ | ..... |
| l | b (l,1) | ..... | b (l,j) | ..... |
| ⋮ | ⋮ | ..... | ⋮ | ..... |
| m | b (m,1) | ..... | b (m,j) | ..... |
| MEAN VALUE | $\nu$ (1) | ..... | $\nu$ (j) | ..... |
| STANDARD DEVIATION VALUE | $\delta$ (1) | ..... | $\delta$ (j) | ..... |

{ RESPONSE VARIABLE VALUES ARE UNKNOWN } — rows 1 through m

FIG.3A

INTER-EXPLANATORY-
VARIABLE DISTANCE $$d(l,i,j) = \frac{|a(i,j) - b(l,j)|}{s(j)}$$

FIG.3B

INTER-CASE DISTANCE $$D(l,i) = \sqrt{\sum_j d(l,i,j)^2}$$

FIG.4

PROBABILITY $$p(c) = \frac{\text{NUMBER OF SIMILAR CASES HAVING "c" AS RESPONSE VARIABLE VALUE}}{k}$$

FIG.5A

KNOWN CASE SET (n=9)

| DATA NAME | AGE (YEARS OLD) | ANNUAL INCOME (TEN THOUSAND YEN) | PURCHASE STATUS |
|---|---|---|---|
| 1 | 30 | 300 | × |
| 2 | 40 | 300 | × |
| 3 | 50 | 300 | × |
| 4 | 30 | 400 | × |
| 5 | 40 | 400 | ○ |
| 6 | 50 | 400 | ○ |
| 7 | 30 | 500 | × |
| 8 | 40 | 500 | ○ |
| 9 | 50 | 500 | ○ |

UNKNOWN CASE SET (m=1)

| DATA NAME | AGE (YEARS OLD) | ANNUAL INCOME (TEN THOUSAND YEN) | PURCHASE STATUS |
|---|---|---|---|
| U1 | 50 | 800 | ? |

INTEGRATED SET (n=9, m=1)

| DATA NAME | AGE (YEARS OLD) | ANNUAL INCOME (TEN THOUSAND YEN) | PURCHASE STATUS |
|---|---|---|---|
| 1 | 30 | 300 | × |
| 2 | 40 | 300 | × |
| 3 | 50 | 300 | × |
| 4 | 30 | 400 | × |
| 5 | 40 | 400 | ○ |
| 6 | 50 | 400 | ○ |
| 7 | 30 | 500 | × |
| 8 | 40 | 500 | ○ |
| 9 | 50 | 500 | ○ |
| U1 | 50 | 800 | ? |

○ : PURCHASED  
× : NOT PURCHASED

FIG.5B $s(j) = \max(\{a(i,j)|i=1...n\} + \{b(i,j)|i=1...m\}) - \min(\{a(i,j)|i=1...n\} + \{b(i,j)|i=1...m\})$

FIG.5C

| DATA NAME | AGE (YEARS OLD) | ANNUAL INCOME (TEN THOUSAND YEN) | PURCHASE STATUS | INTER-CASE DISTANCE |
|---|---|---|---|---|
| 9 | 50 | 500 | ○ | $\sqrt{\left(\dfrac{50-50}{20}\right)^2 + \left(\dfrac{500-800}{500}\right)^2} = 0.6$ |
| 8 | 40 | 500 | ○ | $\sqrt{\left(\dfrac{40-50}{20}\right)^2 + \left(\dfrac{500-800}{500}\right)^2} = 0.78$ |
| 6 | 50 | 400 | ○ | $\sqrt{\left(\dfrac{50-50}{20}\right)^2 + \left(\dfrac{500-800}{500}\right)^2} = 0.8$ |

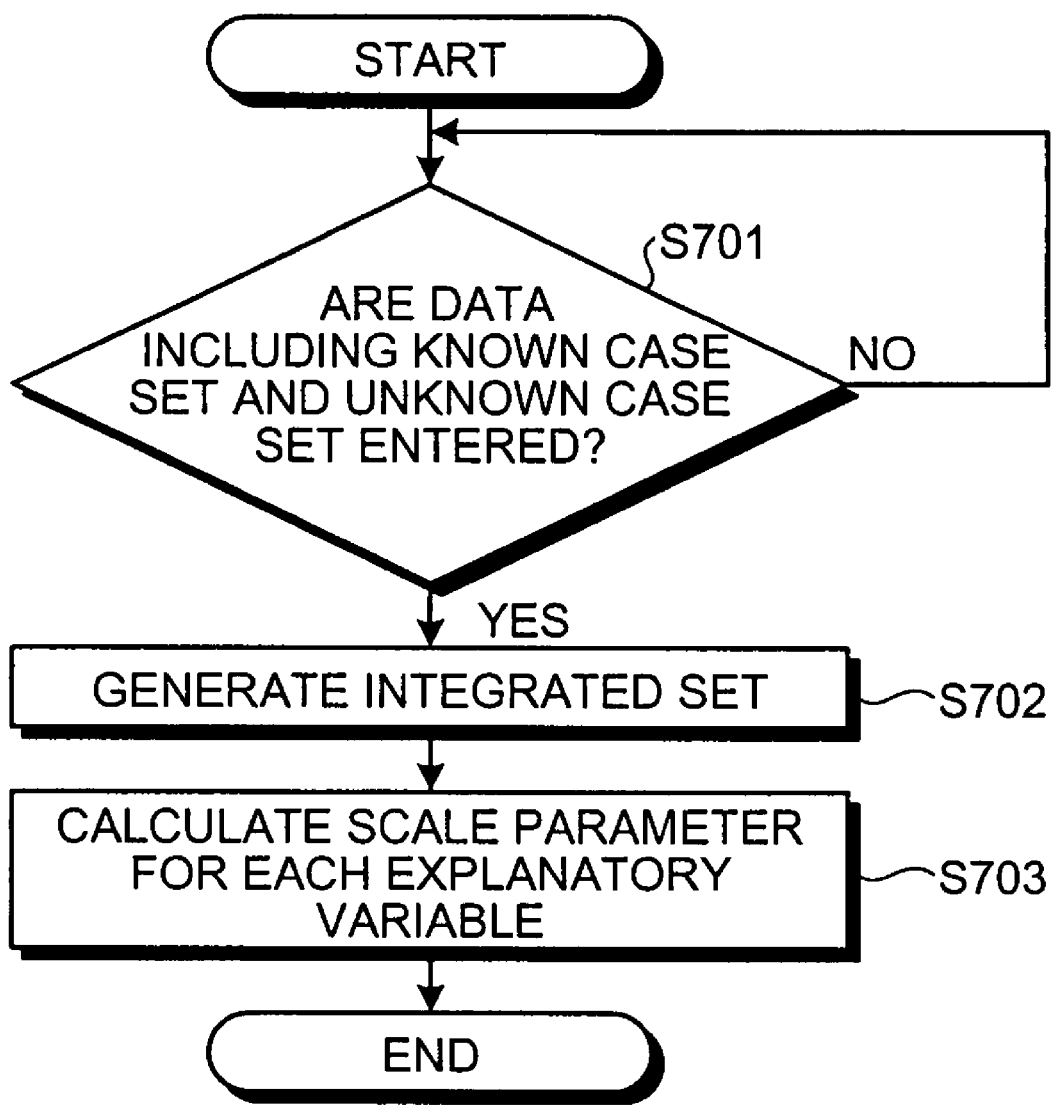

FIG.8A

| DATA NAME | AGE (YEARS OLD) | ANNUAL INCOME (TEN THOUSAND YEN) | PURCHASE STATUS |
|---|---|---|---|
| 1 | 30 | 300 | × |
| 2 | 40 | 300 | × |
| 3 | 50 | 300 | × |
| 4 | 30 | 400 | × |
| 5 | 40 | 400 | ○ |
| 6 | 50 | 400 | ○ |
| 7 | 30 | 500 | × |
| 8 | 40 | 500 | ○ |
| 9 | 50 | 500 | ○ |
| U1 | 50 | 800 | ? |

Rows 1–9: KNOWN CASE SET
Row U1: UNKNOWN CASE SET

○: PURCHASED  ×: NOT PURCHASED

FIG.8B $$s(j) = sd(\{a(i,j) | i=1\ldots n\} + b\{(l,j) | l=1\ldots m\})$$

FIG.8C $$s(j) = \sqrt{\frac{n\sigma(j)^2 + m\delta(j)^2}{n+m} + \frac{mn(\mu(j) - v(j))^2}{n+m}}$$

FIG.8D

| DATA NAME | AGE (YEARS OLD) | ANNUAL INCOME (TEN THOUSAND YEN) | PURCHASE STATUS | INTER-CASE DISTANCE |
|---|---|---|---|---|
| 9 | 50 | 500 | ○ | $\sqrt{\left(\frac{50-50}{8.3}\right)^2 + \left(\frac{500-800}{143}\right)^2} = 2.10$ |
| 8 | 40 | 500 | ○ | $\sqrt{\left(\frac{40-50}{8.3}\right)^2 + \left(\frac{500-800}{143}\right)^2} = 2.42$ |
| 6 | 50 | 400 | ○ | $\sqrt{\left(\frac{50-50}{8.3}\right)^2 + \left(\frac{400-800}{143}\right)^2} = 2.80$ |

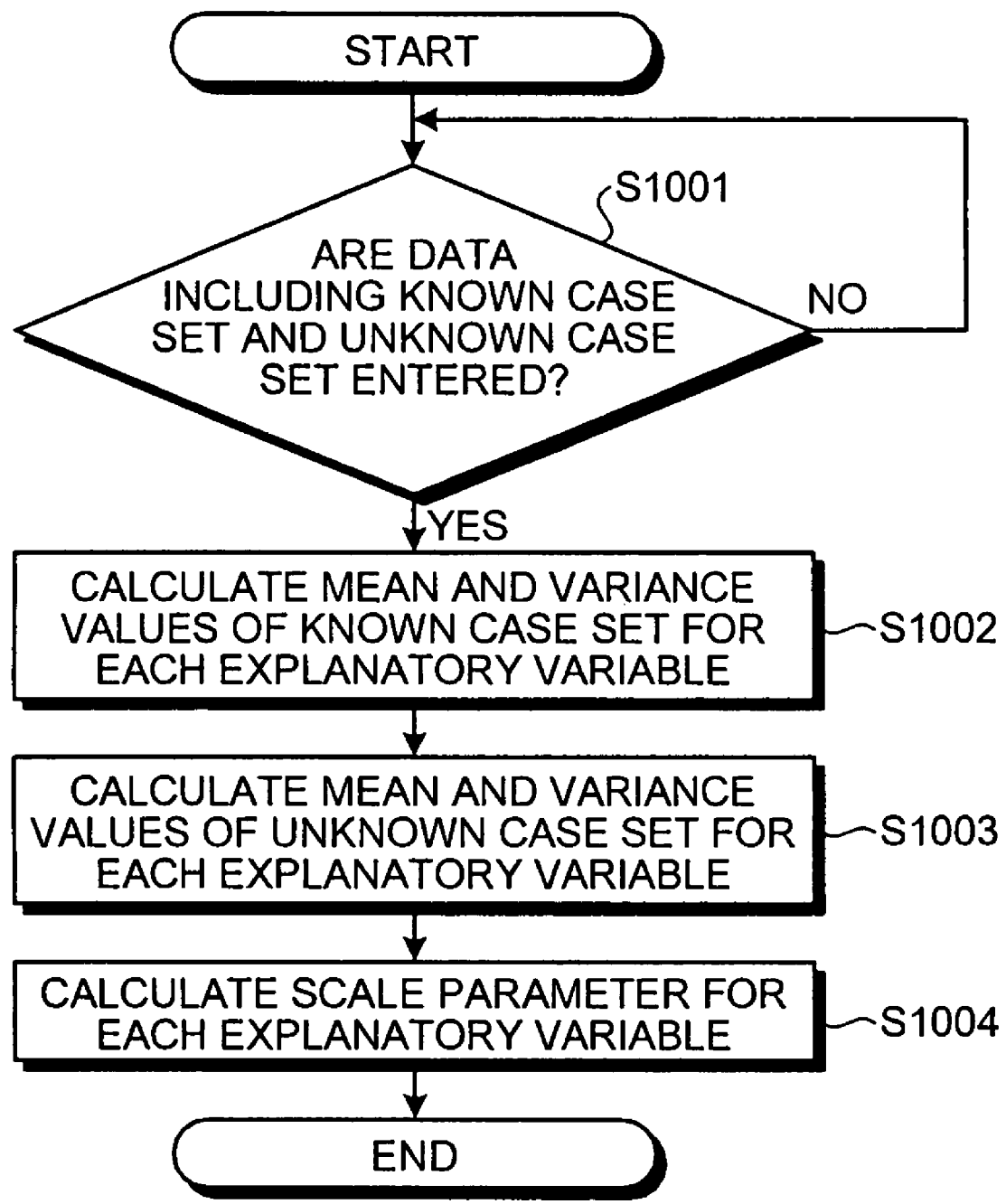

FIG.11A $$S(j) = \sqrt{\frac{\sum_{l=1}^{m}\sum_{i=1}^{n}(a(i,j)-b(l,j))^2}{mn}}$$

FIG.11B $$S(j) = \sqrt{\sigma(j)^2 + \delta(j)^2 + (\mu(j)-\nu(j))^2}$$

FIG.11C

| DATA NAME | AGE (YEARS OLD) | ANNUAL INCOME (TEN THOUSAND YEN) | PUR-CHASE STATUS | INTER-CASE DISTANCE |
|---|---|---|---|---|
| 9 | 50 | 500 | ○ | $\sqrt{\left(\frac{50-50}{12.9}\right)^2 + \left(\frac{500-800}{401}\right)^2} = 0.75$ |
| 6 | 50 | 400 | ○ | $\sqrt{\left(\frac{50-50}{12.9}\right)^2 + \left(\frac{400-800}{401}\right)^2} = 1.00$ |
| 8 | 40 | 500 | ○ | $\sqrt{\left(\frac{40-50}{12.9}\right)^2 + \left(\frac{500-800}{401}\right)^2} = 1.08$ |

FIG.12A $$S(j) = \sqrt{sd\left(\{(a(i,j)-b(l,i))^2 \mid i=1...n, l=1...m\}\right)}$$

FIG.12B

| DATA NAME | AGE (YEARS OLD) | ANNUAL INCOME (TEN THOUSAND YEN) | PUR-CHASE STATUS | INTER-CASE DISTANCE |
|---|---|---|---|---|
| 9 | 50 | 500 | ○ | $\sqrt{\left(\frac{50-50}{13.0}\right)^2 + \left(\frac{500-800}{511}\right)^2} = 0.59$ |
| 6 | 50 | 400 | ○ | $\sqrt{\left(\frac{50-50}{13.0}\right)^2 + \left(\frac{500-800}{511}\right)^2} = 0.79$ |
| 8 | 40 | 500 | ○ | $\sqrt{\left(\frac{50-50}{13.0}\right)^2 + \left(\frac{500-800}{511}\right)^2} = 0.97$ |

FIG.14A

| DATA NAME | AGE (YEARS OLD) | ANNUAL INCOME (TEN THOUSAND YEN) | PURCHASE STATUS |
|---|---|---|---|
| 1 | 30 | 300 | × |
| 2 | 40 | 300 | × |
| 3 | 50 | 300 | × |
| 4 | 30 | 400 | × |
| 5 | 40 | 400 | ○ |
| 6 | 50 | 400 | ○ |
| 7 | 30 | 500 | × |
| 8 | 40 | 500 | ○ |
| 9 | 50 | 500 | ○ |

○: PURCHASED  ×: NOT PURCHASED

FIG.14B

| DATA NAME | AGE (YEARS OLD) | ANNUAL INCOME (TEN THOUSAND YEN) | PURCHASE STATUS | INTER-CASE DISTANCE |
|---|---|---|---|---|
| 6 | 50 | 400 | ○ | 0.61 |
| 9 | 50 | 500 | ○ | 0.61 |
| 5 | 40 | 400 | ○ | 1.36 |
| 8 | 40 | 500 | ○ | 1.36 |
| 3 | 50 | 300 | × | 1.83 |
| 2 | 40 | 300 | × | 2.20 |
| 4 | 30 | 400 | × | 2.51 |
| 7 | 30 | 500 | × | 2.51 |
| 1 | 30 | 300 | × | 3.05 |

FIG.14C

| DATA NAME | AGE (YEARS OLD) | ANNUAL INCOME (TEN THOUSAND YEN) | PURCHASE STATUS | INTER-CASE DISTANCE |
|---|---|---|---|---|
| 9 | 50 | 500 | ○ | 3.66 |
| 8 | 40 | 500 | ○ | 3.86 |
| 7 | 30 | 500 | × | 4.40 |
| 6 | 50 | 400 | ○ | 4.88 |
| 5 | 40 | 400 | ○ | 5.03 |
| 4 | 30 | 400 | × | 5.45 |
| 3 | 50 | 300 | × | 6.10 |
| 2 | 40 | 300 | × | 6.22 |
| 1 | 30 | 300 | × | 6.57 |

US 7,933,853 B2

COMPUTER-READABLE RECORDING MEDIUM, APPARATUS AND METHOD FOR CALCULATING SCALE-PARAMETER

BACKGROUND OF THE INVENTION

1. Field of the Invention

The present invention relates to a computer-readable recording medium, an apparatus and a method for calculating scale-parameter.

2. Description of the Related Art

Recent developments in networks typified by the Internet, increases in capacities of storage media, increases in performance and cost reduction of computers, and the like have allowed to readily store an enormous amount of information. As a method of capitalizing such accumulated data in a business world, solving a prediction problem has received attentions. The solution uses a set of cases of which results are already known (hereinafter, "known cases") corresponding to accumulated data to predict a result of a case of which result is unknown (hereinafter, "unknown case").

Specific examples of the prediction problems include: narrowing addressees of direct mails to increase a response rate; prediction about investment-credit risks; detecting illegal users of credit cards; and detecting unauthorized accesses to a network. As a solution of such a prediction problem, a method of searching for cases that are similar to a prediction target corresponding to the "unknown case" among a set of known cases corresponding to accumulated data, and predicting a result of the unknown case based on a set of the thus-retrieved similar cases is known (prediction based on similar cases).

In the method, each case includes a plurality of explanatory variables each expressed by a numerical value (in the form of "explanatory variable: numerical value"; e.g., "age: 30" and "annual income: 4 million yen") and a single objective variable expressed by a character string (in the form of "objective variable: character string"; e.g., "purchase status: purchased" and "purchase status: not purchased"). A known case has a known "objective variable" corresponding to the result, whereas an unknown case has an unknown "objective variable". In the method, the objective variable of the unknown case is to be predicted based on objective variables of the similar case set retrieved from the known case set. To make the prediction, it is necessary to calculate a distance (inter-case distance) between the unknown case and each known case. However, explanatory variables generally have different distributions; for example, "ages" and "annual incomes" of the case are distributed in different ranges of values. Hence, normalization (scaling) is required.

For example, in Japanese Patent No. 3762840 according to the present applicant, Euclidean distance taken for each explanatory variable is divided by a scale parameter (e.g., the standard deviation of a known case set) of the explanatory variable. This allows to calculate a distance (hereinafter, "inter-case distance") between a known case and an unknown case based on distances (hereinafter, "inter-explanatory-variable distance") taken between each explanatory variable value of the known case and that of the unknown case while normalizing values of each explanatory variable to have a common distribution range.

The above mentioned conventional art is disadvantageous in that, when the explanatory variable values of the unknown case include a value (outlier) significantly deviated from the distribution of explanatory variable values of the known cases, it is difficult to obtain an accurate prediction result even when the scale parameter is calculated based on the explanatory variable values of the known case set.

More specifically, even when a standard deviation obtained from the known cases is used as the scale parameter, the outlier makes it difficult to perform sufficient scaling of the explanatory variable values of the unknown case. Hence, the outlier has a larger influence on the inter-case distance than other explanatory variable values, which deteriorates accuracy of prediction.

An example of making such a prediction based on a known case set of, as shown in FIG. 14A, nine known cases of data names "#1" to "#9" will be described. Each known case includes "age (years old)" and "annual income (ten thousand yen)" as the explanatory variables, and "purchase status: purchased or not purchased" as the objective variable. Among the nine known cases, the standard deviation of the "age" is 8.2 years old, and that of the "annual income" is 820,000 yen. Therefore, 8.2 is the scale parameter of the "age", and 82 is the scale parameter of the "annual income".

An example of making a prediction about the objective variable "purchase status" of an unknown case shown in FIG. 14B having "age: 50" and "annual income: 450" as the explanatory variables will be described below. An inter-explanatory-variable distance of the "age" between the case #1 and the unknown case is a value (hereinafter, "first value") obtained by dividing the absolute deviation between 30 and 50 by 8.2. An inter-explanatory-variable distance of the "annual income" between the case #1 and the unknown case is a value (hereinafter, "second value") obtained by dividing the absolute deviation between 300 and 450 by 82. The inter-case distance between the case #1 and the unknown case is calculated as the square root of the sum of the square of the first value and the square of the second value.

A table shown in FIG. 14B contains inter-case distances, arranged in increasing order of distance, between the unknown case and the nine known cases taken for all the combinations thereof. When the top three known cases (#6, #9, and #5) are retrieved as cases similar to the unknown case, the objective variable "purchase status" thereof are all "purchased". Hence, the unknown case having "age: 50" and "annual income: 450" as the explanatory variables can be predicted accurately to have "purchase status: purchased" as the objective variable.

Meanwhile, another example of making a prediction about the objective variable "purchase status" of an unknown case having "age: 50" and "annual income: 800" as the explanatory variables will be described. Referring to a table shown in FIG. 14C, inter-case distances between the unknown case and the nine known cases taken for all the combinations thereof are calculated using the scale parameters, and arranged in increasing order of distance. The top three known cases (#9, #8, and #7) retrieved as cases similar to the unknown case include the case #7, having "purchase status: not purchased" as the objective variable. The case #7 is undesirably retrieved because the explanatory variable "annual income: 800" of the unknown case is significantly deviated (being an outlier) from a distribution of values of "annual income" of the known cases.

SUMMARY OF THE INVENTION

It is an object of the present invention to at least partially solve the problems in the conventional technology.

According to one aspect of the present invention, there is provided a scale-parameter calculating apparatus that calculates scale parameters, each of which is for use in normalization of a distribution of values of each of explanatory variables in calculation of inter-explanatory variable distances, to predict a value of a objective variable of an unknown case by extracting one or more known cases similar to the unknown case from known cases based on inter-case distances, the inter-case distances being obtained based on the inter-explanatory distances, each of the inter-explanatory variable distances being a distance between each of the known cases and the unknown case taken for each of explanatory variables, each of the cases including the explanatory variables each expressed by a numerical value and the objective variable expressed by a character string, each of the known cases being a case that has a known objective variable value, the unknown case being a case that has an unknown objective variable value.

The apparatus includes a scale-parameter calculating unit that calculates each of the scale parameters for each of the explanatory variables of a union set combined by a known case set of the known cases and an unknown case set of the unknown case; and a scale-parameter holding unit that holds by storing the scale parameters each of which is calculated for each of the explanatory variables in the scale-parameter calculating unit.

According to another aspect of the present invention, there is provided a scale-parameter calculating method that calculates scale parameters, each of which is for use in normalization of a distribution of values of each of explanatory variables in calculation of inter-explanatory variable distances, to predict a value of a objective variable of an unknown case by extracting one or more known cases similar to the unknown case from known cases based on inter-case distances, the inter-case distances being obtained based on the inter-explanatory distances, each of the inter-explanatory variable distances being a distance between each of the known cases and the unknown case taken for each of explanatory variables, each of the cases including the explanatory variables each expressed by a numerical value and the objective variable expressed by a character string, each of the known cases being a case that has a known objective variable value.

The method includes calculating each of the scale parameters for each of the explanatory variables of a union set combined by a known case set of the known cases and an unknown case set of the unknown case; and holding by storing the scale parameters each of which is calculated for each of the explanatory variables in the calculating.

According to still another aspect of the present invention, there is provided a computer-readable recording medium that stores therein a scale-parameter calculating program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A and 1B are schematic diagrams for explaining symbols used in a first embodiment of the present invention;

FIGS. 3A and 3B are schematic diagrams for explaining an inter-case-distance calculating unit according to the first embodiment;

FIG. 4 is a schematic diagram for explaining a probability calculating unit according to the first embodiment;

FIGS. 5A to 5C are schematic diagrams for explaining an overview and features of the scale-parameter calculating device according to the first embodiment;

FIG. 7 is a flowchart of a process procedure performed by the scale-parameter calculating device according to the first embodiment;

FIGS. 8A to 8D are schematic diagrams for explaining an overview and features of a scale-parameter calculating device according to a second embodiment of the present invention;

FIG. 10 is a flowchart of a process procedure performed by the scale-parameter calculating device according to the second embodiment;

FIGS. 11A to 11C are schematic diagrams for explaining an overview and features of a scale-parameter calculating device according to a third embodiment of the present invention;

FIGS. 12A and 12B are schematic diagrams for explaining an overview and features of a scale-parameter calculating device according to a fourth embodiment of the present invention;

FIGS. 14A to 14C are schematic diagrams for explaining problems in a conventional technique.

DETAILED DESCRIPTION OF THE PREFERRED EMBODIMENTS

Figure 2:
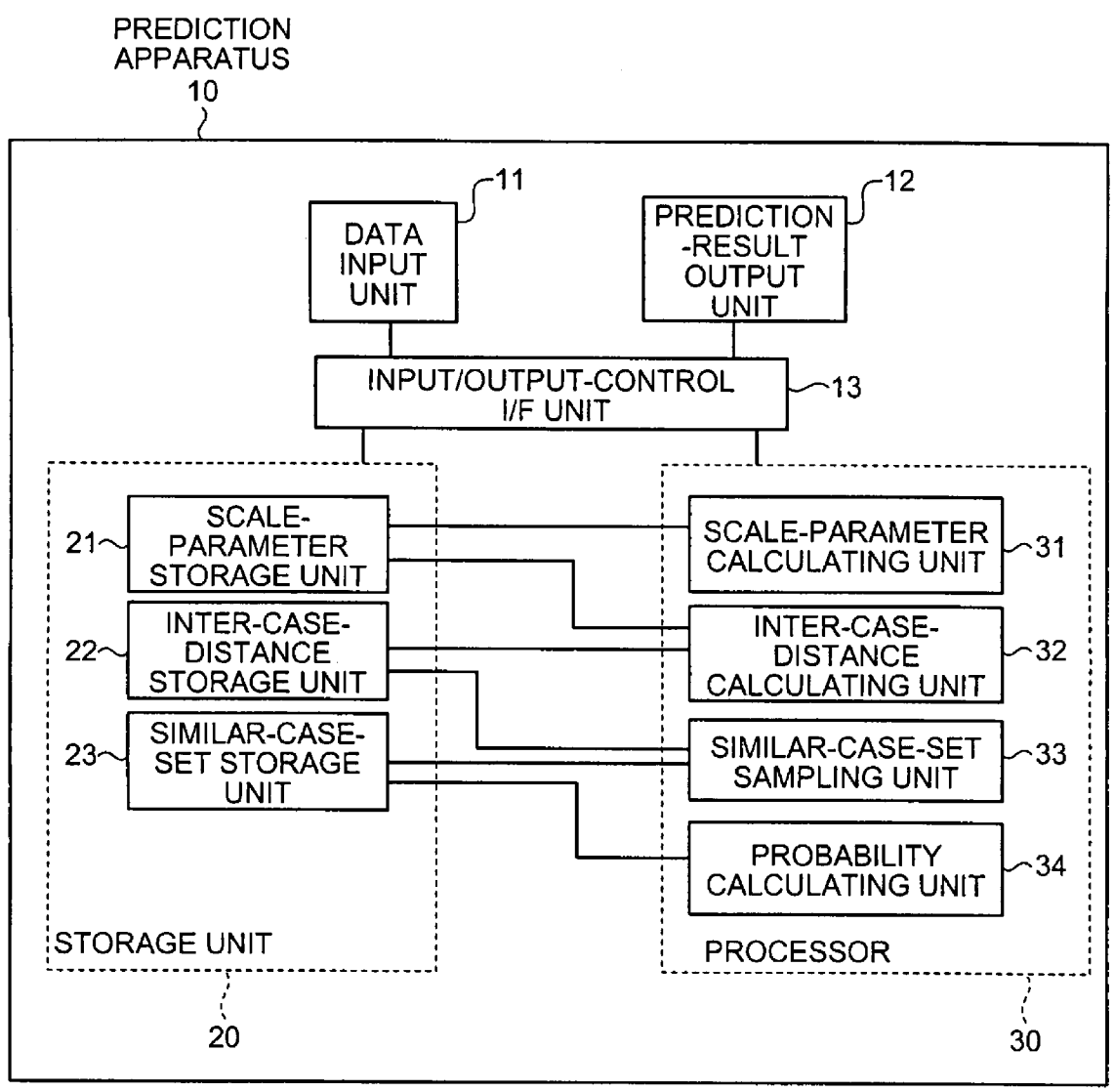
FIG. 2 is a block diagram of a configuration of a prediction apparatus including a scale-parameter calculating device according to the first embodiment.

Exemplary embodiments of the present invention will be described below in detail with reference to the accompanying drawings. Note that the scale-parameter calculating device that includes the scale-parameter calculating program is described in the embodiments. The configuration, process procedures, and effects of a scale-parameter calculating apparatus according to a first embodiment of the present invention will be described below in this order, which are followed by descriptions of a scale-parameter calculating apparatus according to a second embodiment of the invention, that according to a third embodiment of the invention, that according to a fourth embodiment of the invention, and that according to a fifth embodiment of the invention in the same manner as that described in the first embodiment in this order.

First, principal terms used in the embodiments will be described. An "explanatory variable" in the embodiments is a variable expressed by a numerical value in the form of, e.g., "explanatory variable: numerical value", more specifically, "age: 30". An "explanatory variable value" is a value of the explanatory variable; in the example, "30". An "objective variable" is a variable expressed by a character string in the form of, e.g., "objective variable: character string", more specifically, "purchase state: purchased" or "purchase state: not purchased". An "objective variable value" is a character string that expresses the objective variable; in the example, "purchased" or "not purchased" corresponds to the objective variable value. A "case" is a set that includes a plurality of explanatory variables and a single objective variable. Examples of the case of which explanatory variables are "age (years old)" and "annual income (ten thousand yen)" and of which objective variable is the "purchase status: purchased or not purchased" include a case composed of "age: 30", "annual income: 400", and "purchase status: not purchased".

A "known case" is a case that has a known objective variable. For example, when the objective variable (i.e., the purchase status) of a case that has "age: 30" and "annual income: 400" as the explanatory variables is "not purchased", the case is a known case. An "unknown case" is a case of which objective variable is unknown. For example, when whether the objective variable (i.e., purchase status) of a case having "age: 50" and "annual income: 800" as the explanatory variables is "purchased" or "not purchased" is unknown, the case is an unknown case. A "similar case" is a known case that is similar to an unknown case. A "known case set" is a set of a plurality of known cases. An "unknown case set" is a set of a plurality of unknown cases. A "similar case set" is a set of a plurality of similar cases.

In the following description, as shown in FIG. 1A, a "j"th explanatory variable value of an "i"th known case of a known case set composed of "n" known cases is expressed as "a(i,j)", and, as shown in FIG. 1B, a "j"th explanatory variable value of an "l"th unknown case of an unknown case set including "m" unknown cases is expressed as "b(l,j)". A mean value of explanatory variable values of the "j"th explanatory variable of the known case set is expressed as "μ(j)", and a standard deviation value of the same is expressed as "σ(j)" (see FIG. 1A). A mean value of explanatory variable values of the "j"th explanatory variable of the unknown case set is expressed as "v(j)", and a standard deviation value of the same is expressed as "δ(j)" (see FIG. 1B). FIGS. 1A and 1B are schematic diagrams for explaining symbols used in the first embodiment.

Meanwhile, $\{x(i)|i=1\ldots n\}$ represents a set of "n" values of $x(1)$ to $x(n)$; $\{x(i,j)|i=1\ldots n, j=1\ldots m\}$ represents a set of ("n×m") values of $x(1,1)$ to $x(n,m)$; and $sd(\{x(i)|i=1\ldots n\})$ represents a standard deviation of the set $\{x(i)|i=1\ldots n\}$. Hence, the standard deviation value $\sigma(j)$ of the "j"th explanatory variable of the known case set is expressed as: $\sigma(j)=sd(\{a(i,j)|i=1\ldots n\})$; and $max(\{x(i)|i=1\ldots n\})$ and $min(\{x(i)|i=1\ldots n\})$ represent a maximum value and a minimum value of the set $\{x(i)|i=1\ldots n\}$, respectively.

Main features of the scale-parameter calculating apparatus according to the first embodiment will be specifically described with reference to FIGS. 2 to 5C. FIG. 2 is a block diagram of a configuration of a prediction apparatus including the scale-parameter calculating apparatus according to the first embodiment. FIGS. 3A and 3B are schematic diagrams for explaining an inter-case-distance calculating unit according to the first embodiment. FIG. 4 is a schematic diagram for explaining a probability calculating unit according to the first embodiment. FIGS. 5A to 5C are schematic diagrams for explaining an overview and features of the scale-parameter calculating apparatus according to the first embodiment.

As shown in FIG. 2, a prediction apparatus 10 according to the first embodiment includes a data input unit 11, a prediction-result output unit 12, an input/output-control interface (I/F) unit 13, a storage unit 20, and a processor 30.

Data for use in various processes to be performed by the processor 30 are entered to the data input unit 11. More specifically, data including a known case set and an unknown case set, and an operating instruction to start a prediction about an unknown case are entered to the data input unit 11. The data input unit 11 includes a keyboard, a touch panel, and the like as an input unit (not shown) to receive the input data and the instruction to start a prediction.

The prediction-result output unit 12 outputs results of various processes performed by the processor 30. More specifically, the prediction-result output unit 12 outputs each result of prediction on each unknown case obtained from calculations performed by a probability calculating unit 34. The results are output to, e.g., a display connected to the prediction apparatus 10.

The input/output-control I/F unit 13 controls data transmission between the data input unit 11 and the prediction-result output unit 12, and the storage unit 20 and the processor 30.

The storage unit 20 stores results of various processes performed by the processor 30. The storage unit 20 includes, e.g., a scale-parameter storage unit 21, an inter-case-distance storage unit 22, and a similar-case-set storage unit 23 as shown in FIG. 2. Each unit will be described in detail later.

The processor 30 performs various processes based on data including the known case set and the unknown case set transmitted through the input/output-control I/F unit 13. The processor 30 includes, e.g., a scale-parameter calculating unit 31, an inter-case-distance calculating unit 32, a similar-case-set retrieving unit 33, and the probability calculating unit 34 as shown in FIG. 2.

The scale-parameter calculating unit 31 calculates a scale parameter of each explanatory variable based on the input data, and stores the scale parameters in the scale-parameter storage unit 21. In the example shown in FIGS. 14A to 14C, the standard deviation of the explanatory variable values is calculated for each explanatory variable. The standard deviation corresponds to the scale parameter of the explanatory variable for use in normalization of a distribution of values of each of all the explanatory variables. More specifically, the standard deviation $\sigma(j)=sd(\{a(i,j)|i=1\ldots n\})$ of the "j"th explanatory variable values of the known case set is calculated as the scale parameter $s(j)$. This calculation is performed for each of all the explanatory variables. For example, when the explanatory variables are provided in the number of "J", calculations to obtain scale parameters $\sigma(1)$ to $\sigma(J)$ are performed.

The inter-case-distance calculating unit 32 calculates inter-explanatory-variable distances between unknown cases and known cases for each explanatory variable using the scale parameter for a corresponding explanatory variable stored in the scale-parameter storage unit 21. Thereafter, the inter-case-distance calculating unit 32 calculates inter-case distances between the unknown cases and the known cases for all the combinations thereof, and stores the inter-case distances in the inter-case-distance storage unit 22. For example, the inter-case-distance calculating unit 32 calculates an inter-explanatory-variable distance $d(l,i,j)$ of the "j"th explanatory variable between an explanatory variable value $a(i,j)$ of the "i"th known case and an explanatory variable value $b(l,j)$ of the "l"th unknown case using an equation shown in FIG. 3A. This calculation is performed for all the combinations of "n" known cases and "m" unknown cases for each explanatory variable (therefore, "J×n×m" inter-explanatory-variable distance values are obtained). An inter-case distance between the "i"th known case and the "l"th unknown case is calculated based on the J inter-explanatory-variable distance values using an equation shown in FIG. 3B. This calculation is performed for all the combinations of the "n" known cases and the "m" unknown cases (therefore, "n×m" inter-case distance values are obtained).

The similar-case-set retrieving unit 33 retrieves, for each unknown case, at least one case having a inter-case distance value from the known case set based on the inter-case distances stored in the inter-case-set storage unit 22 as a case similar to the unknown case, and stores the thus-retrieved case with the inter-case distance value combined therewith in the similar-case-set storage unit 23. For example, the similar-case-set retrieving unit 33 retrieves top "k" known cases from the known cases arranged in order of increasing inter-case distance. The number of "k" can be a preset value, or specified by a user for each prediction (e.g., k=3).

The probability calculating unit 34 calculates a probability based on the similar case set stored in the similar-case-set storage unit 23, and outputs a prediction result including the probability for each unknown case. More specifically, the probability calculating unit 34 calculates a proportion of the number of known examples each having "c" as the objective variable value to "k", which is the number of the known cases retrieved as the similar case set using an equation shown in FIG. 4. The proportion value is a probability p(c) that the objective variable value of the target unknown cases is "c". In the example shown in FIG. 14B, in which the similar cases are retrieved using the standard deviation of the explanatory variable values of the known case set as the scale parameter, the objective variables (i.e., the purchase statuses) of the "k=3" known cases (#6, #9, and #5) retrieved as the similar case set are all "purchased". Therefore, a probability "p (purchased)" that the objective variable of the unknown case having "age: 50" and "annual income: 450" as the explanatory variables is "purchased" is calculated as 100%. The data outputted as the prediction result can be either only the probability p(c) for each unknown case, or data that includes all of the similar case set, the inter-case distance, and the probability for each unknown case.

The scale-parameter calculating apparatus (including the scale-parameter calculating unit 31 and the scale-parameter storage unit 21) according to the first embodiment is summarized as follows. The scale-parameter calculating apparatus calculates the scale parameter for each explanatory variable. The scale parameter is used to normalize a distribution of values of each explanatory variable in calculation of the inter-explanatory-variable distances. Based on all the inter-explanatory variable distances between the known cases and the unknown cases, the inter-case distances are calculated. A objective variable value of each unknown case is predicted by retrieving a similar case set based on the inter-case distances. The main feature of the scale-parameter calculating apparatus is that the device allows to provide a highly-accurate prediction result.

The main feature will be described briefly. First, the scale-parameter calculating apparatus according to the first embodiment generates a union set of a known case set and an unknown case set. For example, the scale-parameter calculating apparatus generates a union set (hereinafter, "integrated set") of a known case set (n=9, cases #1 to #9) and an unknown case set (m=1, case #U1), each including two (J=2) explanatory variables: "age (years old)" and "annual income (ten thousand yen)". The "objective variable" corresponds to the purchase status that takes either "purchased" or "not purchased". In the example shown in FIG. 5A, a objective variable value of the unknown case set including a single unknown case having "age: 50" and "annual income: 450" as the explanatory variables is to be predicted. Hereinafter, "age (years old)" is expressed as a "j=1"th explanatory variable and "annual income (ten thousand yen)" is expressed as a "j=2"th explanatory variable.

The scale-parameter calculating apparatus according to the first embodiment calculates the difference between a maximum explanatory-variable value and a minimum explanatory-variable value for each explanatory variable of the thus-generated set as a scale parameter of the explanatory variable, and holds the scale parameters. More specifically, of the integrated set (n=9, m=1) shown in a table on the right in FIG. 5A, a scale parameter s(1) of "age (j=1)" is calculated as: 50−30=20 according to an equation shown in FIG. 5B. A scale parameter s(2) of "annual income (j=2)" is similarly calculated as: 800−300=500.

Using the scale parameters, the inter-case-distance calculating unit 32 calculates inter-explanatory-variable distances (d(1, 1, 1) to d(1, 9, 1)) of "age (j=1)" between the known case set (n=9; cases #1 to #9) and the unknown case set (m=1, case #U1) for all the combinations thereof according to the equation shown in FIG. 3A. Similarly, the inter-case-distance calculating unit 32 calculates inter-explanatory-variable distances (d(1, 1, 2) to d(1, 9, 2)) of "annual income (j=2)". Furthermore, the inter-case-distance calculating unit 32 calculates inter-case distances (D(1,1) to D(1,9)) between the known case set and the unknown case set for all the combinations thereof using the equation shown in FIG. 3B.

As shown in FIG. 5C, the similar-case-set retrieving unit 33 retrieves top "k=3" known cases (cases #9, #8, and #6) from the known cases arranged in order of increasing inter-case distance as the similar case set. The objective variables of the three known cases retrieved as the similar case set are all "purchased". Therefore, the probability calculating unit 34 calculates the probability "p (purchased)" as 100%. The equations shown in FIGS. 3A and 3B, into which specific numerical values are substituted, and calculation results thereof are shown in an "inter-case distance" column shown in FIG. 5C.

In the example shown in FIG. 14C in which the standard deviation of the explanatory variable values of the known case set is calculated as the scale parameter, the objective variables of the "k=3" known cases (#9, #8, and #7) are retrieved as the similar case set, and objective variables of the cases #9 and #8 are "purchased". Hence, the probability "p (purchased)" that the objective variable (i.e., the purchase status) of the unknown case is "purchased" is calculated as 66.7%. This result indicates that using the scale parameter calculated by the scale-parameter calculating apparatus according to the first embodiment provides a highly-accurate prediction result even for an unknown case that includes an outlier (in the example, "annual income: 800"). Alternatively, although not illustrated, when the scale parameter is calculated as the difference between the maximum value and the minimum value of the explanatory variable values of the known case set, the known cases "#9, #8, and #7" are retrieved as in the case of FIG. 14C.

Thus, the calculating device according to the first embodiment can provide the scale parameter that is more adapted to an unknown case having an outlier among its explanatory variable values than the scale parameter calculated as the difference between a maximum explanatory-variable value and a minimum explanatory-variable value of the known case set. Accordingly, the scale-parameter calculating apparatus provides, as described as the main feature, a highly-accurate prediction result. In the example, the number of the unknown cases in the unknown case set is one. However, even when the unknown case set includes two or more unknown cases, it is also possible to calculate the scale parameter of each explanatory variable based on the integrated set, thereby making a prediction for each explanatory variable.

Figure 6:
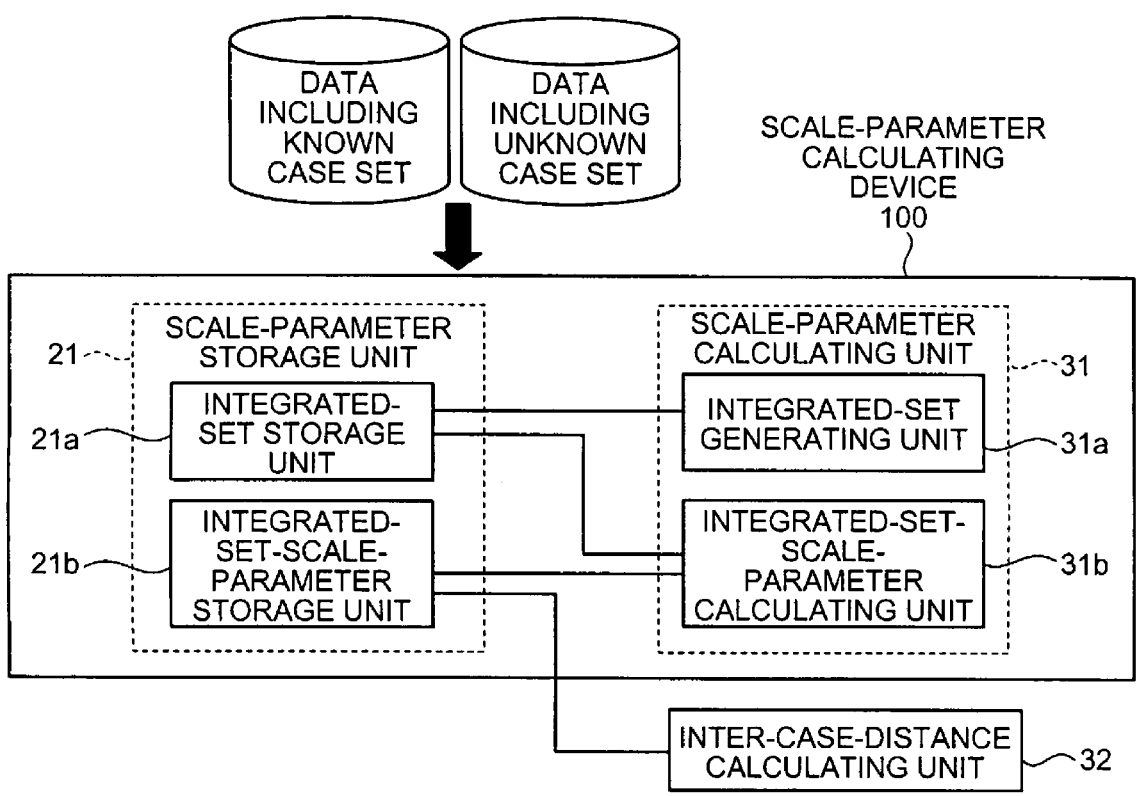
FIG. 6 is a block diagram of a configuration of the scale-parameter calculating device according to the first embodiment.

The scale-parameter calculating apparatus according to the first embodiment will be described with reference to FIG. 6. FIG. 6 is a block diagram of a configuration of the scale-parameter calculating apparatus according to the first embodiment.

As shown in FIG. 6, a scale-parameter calculating apparatus 100 according to the first embodiment includes the scale-parameter calculating unit 31 and the scale-parameter storage unit 21 of the prediction apparatus 10. The scale-parameter calculating apparatus 100 calculates the scale parameter of each explanatory variable based on data on a set of known cases and a set of unknown cases transmitted through the input/output-control I/F unit 13. Based on the scale parameters, the inter-case-distance calculating unit 32 calculates inter-case distances between the unknown cases and the known cases for all the combinations thereof.

The scale-parameter storage unit 21 stores results of various processes performed by the scale-parameter calculating unit 31, which will be described in detail later. As elements closely related to the present invention, the scale-parameter storage unit 21 includes an integrated-set storage unit 21a and an integrated-set-scale-parameter storage unit 21b as shown in FIG. 6. The integrated-set-scale-parameter storage unit 21b corresponds to the "holding calculated scale parameter" in the appended claims. The integrated-set storage unit 21a stores an integrated set generated by an integrated-set generating unit 31a, which will be described later. The integrated set is a union set of a known case set and an unknown case set. The integrated-set-scale-parameter storage unit 21b stores scale parameters calculated by an integrated-set-scale-parameter calculating unit 31b, which will be described later, on an explanatory variable basis.

The scale-parameter calculating unit 31 performs various processes based on data, including a known case set and an unknown case set, transmitted through the input/output-control I/F unit 13. As elements closely related to the present invention, the scale-parameter calculating unit 31 includes the integrated-set generating unit 31a and the integrated-set-scale-parameter calculating unit 31b as shown in FIG. 6. The integrated-set generating unit 31a and the integrated-set-scale-parameter calculating unit 31b correspond to the "calculating scale parameter" in the appended claims. Each unit will be described in detail below.

The integrated-set generating unit 31a generates a union set of a known case set and an unknown case set, and stores the thus-generated set in the integrated-set storage unit 21a. In the example shown in FIG. 5A, the integrated-set generating unit 31a generates the integrated set of the known case set (n=9, cases #1 to #9) and the unknown case set (m=1, case #U1), each including two (J=2) explanatory variables: "age" and "annual income".

The integrated-set-scale-parameter calculating unit 31b calculates the difference between a maximum explanatory-variable value and a minimum explanatory-variable value for each explanatory variable of the thus-generated set as a scale parameter of the explanatory variable, and stores the scale parameters in the integrated-set-scale-parameter storage unit 21b. More specifically, of the integrated set (n=9, m=1) shown in FIG. 5A, the scale parameter $s(1)$ of "age (j=1)" is calculated according to the equation shown in FIG. 5B as: 50−30=20. The scale parameter $s(2)$ of "annual income (j=2)" is similarly calculated as: 800−300=500.

Processes performed by the scale-parameter calculating apparatus 100 according to the first embodiment will be described with reference to FIG. 7. FIG. 7 is a flowchart of a process procedure performed by the scale-parameter calculating apparatus according to the first embodiment.

First, when data including the known case set and the unknown case set are entered to the scale-parameter calculating apparatus 100 according to the first embodiment (YES at step S701), the integrated-set generating unit 31a generates a union set combined the known case set and the unknown case set (step S702).

In the example shown in FIG. 5A, the integrated-set generating unit 31a generates the integrated set of the known case set (n=9, cases #1 to #9) and the unknown case set (m=1, case #U1), each including two (J=2) explanatory variables: "age" and "annual income".

Subsequently, the integrated-set-scale-parameter calculating unit 31b calculates, for each explanatory variable, the difference between the maximum explanatory-variable value and the minimum explanatory-variable value of the thus-generated set as the scale parameter of the explanatory variable (step S703), and the process ends. More specifically, of the integrated set (n=9, m=1) shown in FIG. 5A, the scale parameter $s(1)$ of "age (j=1)" is calculated according to the equation shown in FIG. 5B as: 50−30=20. The scale parameter $s(2)$ of "annual income (j=2)" is similarly calculated as: 800−300=500.

As described above with reference to FIG. 2, calculation of the scale parameters is followed by calculation of the inter-case distances between the unknown cases and the known cases for all the combinations thereof using the scale parameters. Thereafter, a similar case set is retrieved from the known case set for each unknown case, thereby making a prediction of the objective variable of the unknown case.

As described above, according to the first embodiment, the scale parameter is calculated for each explanatory variable of the union set of the known case set and the unknown case set. Accordingly, the scale parameter is more adapted to an unknown case having an outlier among its explanatory variable values than the scale parameter calculated only from the known case set. Hence, a highly-accurate prediction result can be provided.

According to the first embodiment, the difference between the maximum explanatory-variable value and the minimum explanatory-variable value is calculated as the scale parameter of each explanatory variable of the union set of the known case set and the unknown case set.

Accordingly, the scale parameter is more adapted to an unknown case having an outlier among its explanatory-variable values than the scale parameter calculated as the difference between a maximum explanatory-variable value and a minimum explanatory-variable value of the known case set. Hence, a highly-accurate prediction result can be provided.

The first embodiment has described the method of calculating inter-case distance values between known cases and unknown cases for all the combinations thereof using scale parameters calculated through a scale-parameter calculating process, retrieving a similar case set from a known case set for each unknown case based on the inter-case distance values, and calculating a probability based on a objective variable value of the similar case set to make a prediction of the objective variable of the unknown case. However, the invention is not limited to the method, and any other process can be employed as the prediction process to be performed after the calculation of the scale parameters. For example, the inter-case distance can be obtained by setting an "influence degree" for each explanatory variable according to importance, and calculating the distance based on the influence degree and the scale parameter. For another example, the similar case set can be retrieved by setting a threshold value for the inter-case distance. For another example, the probability can be calculated by assigning a "weight" to the inter-case distance.

The first embodiment has described the method of calculating the difference between the maximum explanatory-variable value and the minimum explanatory-variable value as the scale parameter of the union set of the known case set and the unknown case set. In the second embodiment, a method of calculating a standard deviation value of explanatory variable values of the union set of the known case set and the unknown case set as the scale parameter as will be described.

First, main features of the scale-parameter calculating apparatus according to the second embodiment will be specifically described with reference to FIGS. 8A to 8D. FIGS. 8A to 8D are schematic diagrams for explaining an overview and features of the scale-parameter calculating apparatus according to the second embodiment.

The scale-parameter calculating apparatus according to the second embodiment calculates the standard deviation of explanatory variable values for each explanatory variable of the union set of the known case set and the unknown case set as the scale parameter of the explanatory variable. More specifically, the scale parameter s(j) of the "j"th explanatory variable is calculated as the standard deviation of "n+m" values of a union set of a(1,j) to a(n,j) and b(1,j) to b(m,j), as shown in an equation of FIG. 8B. In the union set (see. FIG. 8A) of the known case set (n=9, cases #1 to #9) and the unknown case set (m=1, case #U1) taken as an example as in the case of the first embodiment, the standard deviation of explanatory variable values is calculated for each explanatory variable as the scale parameter of the explanatory variable. More specifically, in the example shown in FIG. 8A, the standard deviation of ten explanatory variable values; more specifically, a(1,j) to (9,j) and b(1,j), is calculated for each of "age (j=1)" and "annual income (j=2)" as the scale parameters of the explanatory variables.

Meanwhile, when the mean value μ(j) and the standard deviation value σ(j) of the known case set ("n" cases) and the mean value ν(j) and the standard deviation value δ(j) of the unknown case set ("m" cases) pertaining to the "j"th explanatory variable are substituted into the equation shown in FIG. 8B, the equation of FIG. 8C is obtained. Thus, when the mean and standard deviation values of the known case set and those of the unknown case set have been calculated for each explanatory variable in advance, the scale parameter of each explanatory variable can be obtained using the mean and standard deviation values.

More specifically, the scale-parameter calculating apparatus according to the second embodiment calculates, according to the equation shown in FIG. 8B or FIG. 8C, the scale parameter s(1) of "age (j=1)" as 8.3, and the scale parameter s(2) of "annual income (j=2)", as 143.

Using the scale parameters, as in the case of the first embodiment, the similar case set (cases #9, #8, and #6) are retrieved as the top "k=3" known cases from the known cases arranged in order of increasing inter-case distance based on the inter-case distances between the known case set and the unknown case set taken for all the combinations thereof as shown in FIG. 8D. The probability "p (purchased)" is calculated as 100% because all of the three cases have "purchased" as the objective variable. The equations shown in FIGS. 3A and 3B, into which specific numerical values are substituted, and calculation results thereof are shown in an "inter-case distance" column of FIG. 8D.

In the example shown in FIG. 14C, in which the standard deviation of the explanatory variable values of the known case set is calculated as the scale parameter, the probability "p (purchased)" of the unknown case is calculated as 66.7%. This result indicates that using the scale parameter calculated by the scale-parameter calculating apparatus according to the second embodiment provides a highly-accurate prediction result even for an unknown case that includes an outlier (in the example, "annual income: 800") as in the case of the first embodiment.

Thus, the scale-parameter calculating apparatus according to the second embodiment provides the scale parameter that is more adapted to an unknown case having an outlier among its explanatory variable values includes than the scale parameter, which is the standard deviation of explanatory variable values of the known case set. Hence, a highly-accurate prediction result can be provided. In the example, the number of the unknown cases in the unknown case set is one. However, even when the unknown case set includes two or more unknown cases, it is also possible to calculate the scale parameter of each explanatory variable based on the integrated set to make a prediction for each explanatory variable.

Figure 9:
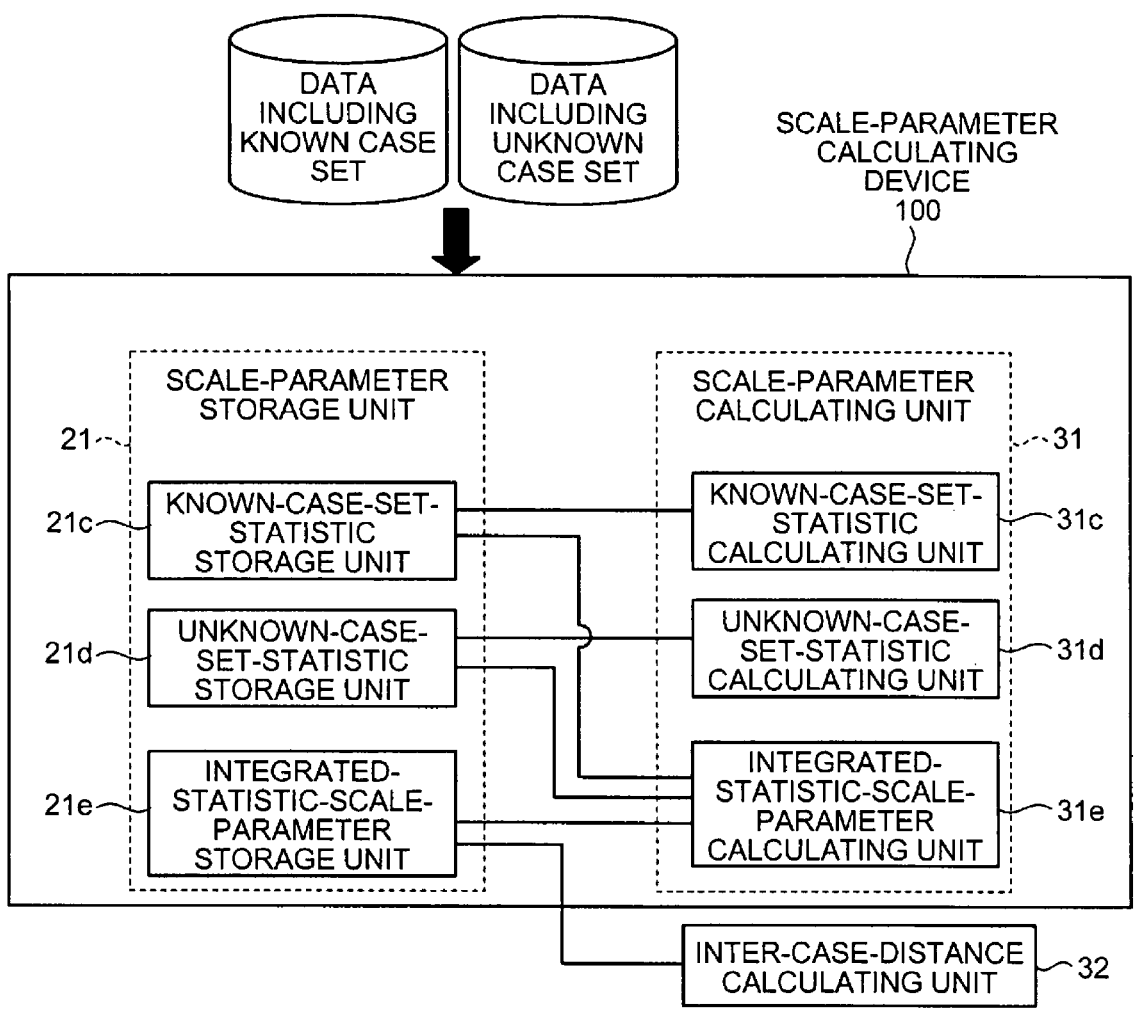
FIG. 9 is a block diagram of a configuration of the scale-parameter calculating device according to the second embodiment.

The scale-parameter calculating apparatus according to the second embodiment will be described with reference to FIG. 9. FIG. 9 is a block diagram of a configuration of the scale-parameter calculating apparatus according to the second embodiment. The configuration of the units of the scale-parameter calculating apparatus according to the second embodiment and processes performed thereby are identical to those (the inter-case-distance storage unit 22, the similar-case-set storage unit 23, the inter-case-distance calculating unit 32, the similar-case-set retrieving unit 33, and the probability calculating unit 34) shown in FIG. 2. Accordingly, their descriptions are omitted.

As shown in FIG. 9, the scale-parameter calculating apparatus 100 according to the second embodiment includes, as in the case of the first embodiment, the scale-parameter calculating unit 31 and the scale-parameter storage unit 21 of the prediction apparatus 10. The scale-parameter calculating apparatus 100 calculates the scale parameter of each explanatory variable based on data including a set of known cases and a set of unknown cases transmitted through the input/output-control I/F unit 13. Based on the scale parameters, the inter-case-distance calculating unit 32 calculates the inter-case distances between the unknown cases and the known cases for all the combinations thereof.

The scale-parameter storage unit 21 stores results of various processes performed by the scale-parameter calculating unit 31, which will be described in detail later. As elements closely related to the present invention, the scale-parameter storage unit 21 includes a known-case-set-statistic storage unit 21c, an unknown-case-set-statistic storage unit 21d, and an integrated-statistic-scale-parameter storage unit 21e as shown in FIG. 9. The integrated-statistic-scale-parameter storage unit 21e corresponds to the "holding calculated scale parameter" in the appended claims. The known-case-set-statistic storage unit 21c stores the mean and variance values of the known case set calculated for each explanatory variable by a known-case-set-statistic calculating unit 31c, which will be described later. The unknown-case-set-statistic storage unit 21d stores the mean and variance values of the unknown case set calculated for each explanatory variable by an unknown-case-set-statistic calculating unit 31d, which will be described later. The integrated-statistic-scale-parameter storage unit 21e stores scale parameters calculated by an integrated-statistic-scale-parameter calculating unit 31e, which will be described later, on an explanatory variable basis.

The scale-parameter calculating unit 31 performs various processes based on data, including the known case set and the unknown case set, transmitted through the input/output-control I/F unit 13. As elements closely related to the present invention, the scale-parameter calculating unit 31 includes the known-case-set-statistic calculating unit 31c, the unknown-case-set-statistic calculating unit 31d, and the integrated-statistic-scale-parameter calculating unit 31e as shown in FIG. 9. The known-case-set-statistic calculating unit 31c, the unknown-case-set-statistic calculating unit 31d, and the integrated-statistic-scale-parameter calculating unit 31e correspond to the "calculating scale parameter" in the appended claims. Each unit will be described in detail below.

The known-case-set-statistic calculating unit 31c calculates the mean and variance values of the known case set for each explanatory variable, and stores the mean and variance values in the known-case-set-statistic storage unit 21c. That is, the known-case-set-statistic calculating unit 31c calculates the mean value μ(j) and the standard deviation value σ(j) of the known case set ("n" cases) for each explanatory variable. More specifically, the known-case-set-statistic calculating unit 31c calculates the mean and standard deviation values of the cases #1 to #9 shown in FIG. 8A for each of two explanatory variables: "age (j=1)" and "annual income (j=2)" to obtain μ(1)=40 and μ(2)=400, and σ(1)=8.2 and σ(2)=82.

The unknown-case-set-statistic calculating unit 31d calculates the mean and variance values of the unknown case set for each explanatory variable, and stores the mean and variance values in the unknown-case-set-statistic storage unit 21d. That is, the unknown-case-set-statistic calculating unit 31d calculates the mean value ν(j) and the standard deviation value δ(j) of the unknown case set ("m" cases) for each explanatory variable. More specifically, the unknown-case-set-statistic calculating unit 31d calculates the mean and standard deviation values of the case #U1 shown in FIG. 8A for each of two explanatory variables: "age (j=1)" and "annual income (j=2)" to obtain ν(1)=50 and ν(2)=800, and δ(1)=0 and δ(2)=0.

The integrated-statistic-scale-parameter calculating unit 31e calculates the standard deviation of explanatory variable values for each explanatory variable of the union set of the known case set and the unknown case set as the scale parameter of the explanatory variable. That is, the integrated-statistic-scale-parameter calculating unit 31e calculates the standard deviation of the explanatory variable values (see FIG. 8B) of the union set of the known case set and the unknown case set using the equation shown in FIG. 8C. More specifically, the integrated-statistic-scale-parameter calculating unit 31e substitutes the mean and variance values of each explanatory variable of the known case set stored in the known-case-set-statistic storage unit 21c and those of the unknown case set stored in the unknown-case-set-statistic storage unit 21d into the equation shown in FIG. 8C, thereby obtaining the standard deviation of the values of each explanatory variable as the scale parameter of the explanatory variable.

Specifically, for example, the scale parameter of "age (j=1)" is calculated by substituting "ν(1)=40, σ(1)=8.2, ν(1)=50, and δ(1)=0" into the equation shown in FIG. 8C as s(1)= 8.3. Similarly, the scale parameter of "annual income (j=2)" is calculated by substituting "μ(2)=400, σ(2)=82, ν(2)=800, and δ(2)=0" into the equation as s(2)=143.

Processes performed by the scale-parameter calculating apparatus 100 according to the second embodiment will be described with reference to FIG. 10. FIG. 10 is a flowchart of a process procedure performed by the scale-parameter calculating apparatus according to the second embodiment.

First, when data including the known case set and the unknown case set are entered to the scale-parameter calculating apparatus 100 according to the second embodiment (YES at step S1001), the known-case-set-statistic calculating unit 31c calculates the mean and variance values of the known case set for each explanatory variable (step S1002). More specifically, the known-case-set-statistic calculating unit 31c calculates the mean value μ(j) and the standard deviation value σ(j) of the known case set ("n" cases) for each explanatory variable.

Subsequently, the unknown-case-set-statistic calculating unit 31d calculates the mean and variance values of the unknown case set for each explanatory variable (step S1003). More specifically, the unknown-case-set-statistic calculating unit 31d calculates the mean value ν(j) and the standard deviation value δ(j) of the unknown case set ("m" cases) for each explanatory variable.

The integrated-statistic-scale-parameter calculating unit 31e calculates the standard deviation of the explanatory variable values of each explanatory variable of the union set of the known case set and the unknown case set as the scale parameter of the explanatory variable (step S1004), and the process ends. More specifically, the integrated-statistic-scale-parameter calculating unit 31e substitutes the mean value μ(j) and the standard deviation value σ(j) of each explanatory variable of the known case set ("n" cases) 21c and the mean value μ(j) and the standard deviation value σ(j) of each explanatory variable of the unknown case set ("m" cases) into the equation shown in FIG. 8C to obtain the standard deviation of the explanatory variable values as the scale parameter of each explanatory variable.

As described above with reference to FIG. 2, calculation of the scale parameters is followed by calculation of the inter-case distances between the unknown cases and the known cases for all the combinations thereof using the scale parameters. Thereafter, a similar case set is retrieved from the known case set for each unknown case, thereby making a prediction of the objective variable of the unknown case.

As described above, according to the second embodiment, the standard deviation of explanatory variable values is calculated for each explanatory variable of the union set of the known case set and the unknown case set as the scale parameter of the explanatory variable. Accordingly, the scale parameter is more adapted to an unknown case including an outlier among its explanatory variable values than the scale parameter, which is the standard deviation of the explanatory variable values of the known case set. Hence, a highly-accurate prediction result can be provided.

According to the second embodiment, the scale parameter can be calculated not only from the calculation based on a union set of the known case set and the unknown case set but also from the calculation of the mean and standard deviation values obtained by statistically processing the known case set and the unknown case independently. For example, when the mean and standard deviation values of a known case set have been calculated in advance, predictions about various unknown case sets can be made only by calculating the mean and standard deviation values for each unknown case set to obtain scale parameters. This allows to provide highly-accurate prediction results quickly. Each of the first and second embodiments has described the method of calculating the scale parameter based on the union set of the known case set and the unknown case set. In the third embodiment, a method of calculating the scale parameter such that the mean square of inter-explanatory-variable distances between unknown cases and known cases taken for all the combinations thereof assumes a constant value for every explanatory variable will be described.

First, main features of the scale-parameter calculating apparatus according to the third embodiment will be specifically described with reference to FIGS. 11A to 11C. FIGS. 11A to 11C are schematic diagrams for explaining an overview and features of the scale-parameter calculating apparatus according to the third embodiment.

The scale-parameter calculating apparatus according to the third embodiment calculates the scale parameter of each explanatory variable such that the mean square of inter-explanatory-variable distances taken for all the combinations of known cases of a known case set and unknown cases of an unknown case set assumes a constant value for every explanatory variable. For example, when a scale parameter of each explanatory variable is calculated using an equation shown in FIG. 11A, the mean square of inter-explanatory-variable distances taken between the unknown cases and the known cases for all the combinations thereof assumes a single value "1" for every explanatory variable. More specifically, the scale parameter s(j) of the "j"th explanatory variable is calculated using the "differences: a(i,j)–b(l,j)" taken for all the combinations (="n×m") of a(1,j) to a(n,j) and b(1,j) to b(m,j) using the equation shown in FIG. 11A.

As in the case of the first embodiment, when the union set (see FIG. 8A) of the known case set (n=9; cases #1 to #9) and the unknown case set (m=1, case #U1) shown in FIG. 5A is taken as an example, the sum of the squares of the differences between a(1,j) to b(9,j) and b(1,j) is divided by "1×9=9". The square root of the division result is calculated for each of "age (j=1)" and "annual income (j=2)" as the scale parameter.

Meanwhile, when the mean value μ(j) and the standard deviation value σ(j) of the known case set ("n" cases) and the mean value ν(j) and the standard deviation value δ(j) of the unknown case set ("m" cases) of the "j"th explanatory variable are substituted into the equation shown in FIG. 11A, the equation of FIG. 1B is obtained. Thus, when the mean and standard deviation values of the known case set and those of the unknown case set have been calculated for each explanatory variable in advance, the scale parameter of each explanatory variable can be obtained using the mean and standard deviation values.

More specifically, the scale-parameter calculating apparatus according to the third embodiment calculates, according to the equation shown in FIG. 11A or FIG. 11B, the scale parameter s(1) of "age (j=1)" as 12.9, and the scale parameter s(2) of "annual income (j=2)" as 401.

Using the scale parameters, as shown in FIG. 11C, the similar case set (cases #9, #6, and #8) are retrieved as the top "k=3" known cases from the known cases arranged in order of increasing inter-case distance based on the inter-case distances between the known case set and the unknown case set taken for all the combinations as in the case of the first or second embodiment. The probability "p (purchased)" is calculated as 100% because all of the three cases have "purchased" as the objective variable. In an inter-case distance column of FIG. 11C, the equations of FIG. 3A and FIG. 3B, into which specific numerical values are substituted, and results of the calculation are shown.

In the example shown in FIG. 14C, in which the standard deviation of the explanatory variable values of the known case set is calculated as the scale parameter, the probability "p (purchased)" of the unknown case is calculated as 66.7%. This result indicates that using the scale parameter calculated by the scale-parameter calculating apparatus according to the third embodiment provides a highly-accurate prediction result even for an unknown case that includes an outlier (in the example, "annual income: 800") as in the case of the first embodiment.

Thus, the scale-parameter calculating apparatus according to the third embodiment calculates the scale parameter that normalizes a distribution of values of each explanatory variable, thereby providing a highly-accurate prediction result. In the example, the number of the unknown cases in the unknown case set is one. However, even when the unknown case set includes two or more unknown cases, it is also possible to calculate the scale parameter of each explanatory variable based on the integrated set, thereby making a prediction for each explanatory variable.

The scale-parameter calculating apparatus according to the third embodiment will be described with reference to FIG. 9. FIG. 9 is a block diagram of the configuration of the scale-parameter calculating apparatus according to the second embodiment. As shown in FIG. 9, the scale-parameter calculating apparatus 100 according to the third embodiment is identical with the scale-parameter calculating apparatus 100 according to the second embodiment in configuration, but different in the process performed by the integrated-statistic-scale-parameter calculating unit 31e. Hereinafter, the configuration will be described with a focus on the process. The configuration of the units of the scale-parameter calculating apparatus according to the third embodiment and processes performed thereby are identical to those (the inter-case-distance storage unit 22, the similar-case-set storage unit 23, the inter-case-distance calculating unit 32, the similar-case-set retrieving unit 33, and the probability calculating unit 34) shown in FIG. 2. Accordingly, their descriptions are omitted.

The integrated-statistic-scale-parameter calculating unit 31e calculates the scale parameter of each explanatory variable such that the mean square of the inter-explanatory-variable distances between the known cases of the known case set and the unknown cases of the unknown case set taken for all the combinations thereof assumes a constant value for every explanatory variable, and stores the scale parameters in the integrated-statistic-scale-parameter storage unit 21e. For example, when a scale parameter of each explanatory variable is calculated using an equation shown in FIG. 11B, the mean square of the inter-explanatory-variable distances between the unknown cases and the known cases taken for all the combinations thereof assumes a single value "1" for every explanatory variable.

More specifically, the integrated-statistic-scale-parameter calculating unit 31e substitutes the mean and variance values, which are calculated for each explanatory variable of the known case set and stored in the known-case-set-statistic storage unit 21c, and those of the unknown case set stored in the unknown-case-set-statistic storage unit 21d into the equation shown in FIG. 11B, thereby calculating the standard deviation of values of each explanatory variable as the scale parameter of the explanatory variable for every explanatory variable.

For example, of the union set of the known case set and the unknown case set (see FIG. 8A) shown in FIG. 5A, the scale parameter of "age (j=1)" is calculated by substituting "μ(1)= 40, σ(1)=8.2, ν(1)=50, and δ(1)=0" into the equation shown in FIG. 8C as s(1)=8.3. Similarly, the scale parameter of "annual income (j=2)" is calculated by substituting "μ(2)= 400, σ(2)=82, ν(2)=800, and δ(2)=0" as s(2)=401.

Processes performed by the scale-parameter calculating apparatus 100 according to the third embodiment will be described with reference to FIG. 10. FIG. 10 is a flowchart of a process procedure performed by the scale-parameter calculating apparatus according to the second embodiment.

The process procedure performed by the scale-parameter calculating apparatus 100 according to the third embodiment is identical with that performed by the scale-parameter calculating apparatus 100 according to the second embodiment, but different in the process performed by the integrated-statistic-scale-parameter calculating unit 31e at step S1003 of FIG. 10.

More specifically, the integrated-statistic-scale-parameter calculating unit 31e according to the third embodiment calculates, at step S1003 of FIG. 10, the scale parameter of each explanatory variable by substituting the mean and standard deviation values of each explanatory variable of the known case set and those of the unknown case set into the equation shown in FIG. 11B rather than into the equation shown in FIG. 8C.

As described above with reference to FIG. 2, calculation of the scale parameters is followed by calculation of inter-case distances between the unknown cases and the known cases for all the combinations thereof using the scale parameters. Thereafter, a similar case set is retrieved from the known case set for each unknown case, thereby making a prediction of the objective variable of the unknown case.

As described above, according to the third embodiment, the scale parameter of each explanatory variable is calculated such that the mean square of the inter-explanatory-variable distances between the known cases of the known case set and the unknown cases of the unknown case set taken for all the combinations thereof assumes a single value "1" for every explanatory variable. Hence, the scale parameter that normalizes a distribution of values of each explanatory variable is obtained, which allows to provide a highly-accurate prediction result.

According to the third embodiment, the scale parameter can be obtained not only from the calculation based on a union set of the known case set and the unknown case set but also from the calculation of the mean and standard deviation values obtained by statistically processing the known case set and the unknown case set independently. For example, when the mean and standard deviation values of a known case set have been calculated in advance, predictions about various unknown case sets can be made only by calculating the mean and standard deviation values for each unknown case set to obtain scale parameters. Hence, highly-accurate prediction results can be obtained quickly.

In the third embodiment, the method of calculating a scale parameter such that the mean square of the inter-explanatory-variable distances between the unknown cases and known cases taken for all the combinations thereof assumes a constant value has been described. In the fourth embodiment, a method of calculating the scale parameter such that the standard deviation of the squares of the inter-explanatory-variable distances between the unknown cases and known cases taken for all the combinations thereof assumes a constant value will be described.

First, main features of the scale-parameter calculating apparatus according to the fourth embodiment will be specifically described with reference to FIGS. 12A and 12B. FIGS. 12A and 12B are schematic diagrams for explaining an overview and features of the scale-parameter calculating apparatus according to the fourth embodiment.

The scale-parameter calculating apparatus according to the fourth embodiment calculates the scale parameter of each explanatory variable such that the standard deviation of the squares of the inter-explanatory-variable distances between the known cases of the known case set and the unknown cases of the unknown case set taken for all the combinations thereof assumes a constant value for every explanatory variable. For example, when a scale parameter of each explanatory variable is calculated using an equation shown in FIG. 12A, the standard deviation of the squares of the inter-explanatory-variable distances taken between the unknown cases and the known cases for all the combinations thereof assumes a single value "1" for every explanatory variable. More specifically, the scale parameter s(j) of the "j"th explanatory variable is calculated using a standard deviation of squares of the differences "a(i,j)–b(l,j)" calculated for all the (="n×m") combinations of a(1,j) to a(n,j) and b(1,j) to b(m,j) using the equation shown in FIG. 12A.

In the union set (see FIG. 8A) of the known case set (n=9, cases #1 to #9) and the unknown case set (m=1, case #U1) shown in FIG. 5A taken as an example as in the case of the first embodiment, squares of the differences between a(1,j) to a(9,j) and b(1,j) (therefore, nine values) are calculated, and the square root of the standard deviation of the squares is calculated for each of "age (j=1)" and "annual income (j=2)" as the scale parameter of each explanatory variable. Hence, the scale parameter s(1) of "age (j=1) is calculated as 13.0, and the scale parameter s(2) of "annual income (j=2)" is calculated as 511.

Using the scale parameters, as shown in FIG. 12B, the similar case set (cases #9, #6, and #8) are retrieved as the top "k=3" known cases from the known cases arranged in order of increasing inter-case distance based on the inter-case distances between the known case set and the unknown case set taken for all the combinations as in the case of the first to third embodiments. The probability "p (purchased)" is calculated as 100% because all of the thus-retrieved cases have "purchased" as the objective variable. In an inter-case distance column of FIG. 12B, the equations of FIGS. 3A and 3B, into which specific numerical values are substituted, and results of the calculation are shown.

In the example shown in FIG. 14C, in which the standard deviation of the explanatory variable values of the known case set is calculated as the scale parameter, the probability "p (purchased)" of the unknown case is calculated as 66.7%. This result indicates that using the scale parameter calculated by the scale-parameter calculating apparatus according to the fourth embodiment provides a highly-accurate prediction result even for an unknown case that includes an outlier (in the example, "annual income: 800") as in the case of the first embodiment.

Thus, the scale-parameter calculating apparatus according to the fourth embodiment can provide scale parameters each normalizes a distribution of values of each explanatory variable, thereby providing a highly-accurate prediction result. In the example, the number of the unknown cases in the unknown case set is one. However, even when the unknown case set includes two or more unknown cases, it is also possible to calculate the scale parameter of each explanatory variable based on the integrated set, thereby making a prediction for each explanatory variable.

The scale-parameter calculating apparatus according to the fourth embodiment will be described with reference to FIG. 6. FIG. 6 is the block diagram of the configuration of the scale-parameter calculating apparatus according to the first embodiment. As shown in FIG. 6, the scale-parameter calculating apparatus 100 according to the fourth embodiment is identical with the scale-parameter calculating apparatus 100 according to the first embodiment in configuration, but different in the process performed by the integrated-set-scale-parameter calculating unit 31b. Hereinafter, the configuration will be described with a focus on the process. The configuration of the units of the scale-parameter calculating apparatus according to the fourth embodiment and processes performed thereby are identical to those (the inter-case-distance storage unit 22, the similar-case-set storage unit 23, the inter-case-distance calculating unit 32, the similar-case-set retrieving unit 33, and the probability calculating unit 34) shown in FIG. 2. Accordingly, their descriptions are omitted.

The integrated-set-scale-parameter calculating unit 31b calculates the scale parameter of each explanatory variable such that the standard deviation of the squares of the inter-explanatory-variable distances between the known cases of the known case set and the unknown cases of the unknown case set taken for all the combinations thereof assumes a constant value for every explanatory variable, and stores the scale parameters in the integrated-set-scale-parameter storage unit 21b. For example, when the scale parameter of each explanatory variable is calculated using the equation shown in FIG. 12A, the mean square of inter-explanatory-variable distances between the unknown cases and the known cases taken for all the combinations thereof assumes a single value "1" for every explanatory variable.

In the union set (see FIG. 8A) of the known case set (n=9, cases #1 to #9) and the unknown case set (m=1, case #U1) shown in FIG. 5A taken as an example as in the case of the first embodiment, squares of the differences between a(1,j) to a(9,j) and b(1,j) (therefore, nine values) are calculated, and the square root of the standard deviation of the squares is calculated for each of "age (j=1)" and "annual income (j=2)" as the scale parameter of each explanatory variable. Thus, the scale parameter s(1) of "age (j=1) is calculated as 13.0, and the scale parameter s(2) of "annual income (j=2)" is calculated as 511.

Processes performed by the scale-parameter calculating apparatus 100 according to the fourth embodiment will be described with reference to FIG. 7. FIG. 7 is the flowchart of the process procedure performed by the scale-parameter calculating apparatus according to the first embodiment.

The process procedure performed by the scale-parameter calculating apparatus 100 according to the fourth embodiment is identical with that performed by the scale-parameter calculating apparatus 100 according to the first embodiment, but different in the process performed by the integrated-set-scale-parameter calculating unit 31*b* at step S703 of FIG. 7.

More specifically, the integrated-set-scale-parameter calculating unit 31*b* according to the fourth embodiment calculates, at step S703 of FIG. 7, the scale parameter of each explanatory variable such that the mean square of the inter-explanatory-variable distances between the unknown cases and the known cases taken for all the combinations thereof assumes a single value "1" for every explanatory variable using the equation shown in FIG. 12A.

As described above with reference to FIG. 2, the calculation of the scale parameters is followed by calculation of the inter-case distances between the unknown cases and the known cases for all the combinations thereof using the scale parameters. Thereafter, a similar case set is retrieved from the known case set for each unknown case, thereby making a prediction of the objective variable of the unknown case.

As described above, according to the fourth embodiment, the scale parameters are calculated for each explanatory variable such that the mean square of the inter-explanatory-variable distances between known cases of a known case set and unknown cases of an unknown case set taken for all the combinations thereof assumes a single value "1" for every explanatory variable. Accordingly, each scale parameter normalizes a distribution of values of each explanatory variable, thereby providing a highly-accurate prediction result.

The scale-parameter calculating apparatus of each of the first to fourth embodiments has been described. Alternatively, the present invention can be embodied in various modes other than the embodiments. Hence, various embodiments will be described as a scale-parameter calculating apparatus according to the fifth embodiment below in subgroups of (1) to (4).

(1) Union Set of Known Case Set and Unknown Case Set (Integrated Set)

Although each of the first to fourth embodiments has described the method of calculating the scale parameter of each explanatory variable of the union set of the known case set and the unknown case set, the present invention is not limited thereto. Alternatively, a method of sequentially retrieving one unknown case from the unknown case set as a prediction target, and calculating a scale parameter of each explanatory variable of a union set of the thus-retrieved unknown case and the known case set can be employed.

More specifically, rather than calculating the scale parameters for each explanatory variable of a union set of a known case set of "n" known cases and an unknown case set of "m" unknown cases based on explanatory variable values of "n" known cases and "m" unknown cases, the scale parameters are calculated as follows. An unknown case, corresponding to the prediction target, is sequentially retrieved from the unknown case set to form a temporary integrated set composed of the known case set of the "n" known cases and an unknown case set of the single unknown case (therefore, the temporary integrated set includes "n+1" cases). Each of the scale parameters is calculated based on the explanatory variable values of the "n" known cases and the single unknown case of the temporary integrated set for each explanatory variable.

This method allows to eliminate, from calculation of the scale parameter of each unknown case, the influence of outliers that are independently included in values of each explanatory variable of an unknown case of the unknown case set, thereby providing a highly-accurate prediction result. In addition, the method allows to calculate the scale parameter of each unknown case even when the prediction target is only one unknown case, thereby providing a highly-accurate prediction result quickly.

(2) Unknown Case Set

Although each of the first to fourth embodiments has described the method of calculating the scale parameter of each explanatory variable of the union set of the known case set and the unknown case set, the present invention is not limited thereto. Alternatively, a method of further classifying the unknown case set into unknown case subsets based on explanatory variables that includes outliers, generating union sets of one of the unknown case subsets and the known case set for each unknown case subset, and calculating the scale parameter for each of the thus-generated union sets can be employed.

Accordingly, this method allows to calculate the scale parameter for each of the unknown case subsets that are similar in terms of presence/absence of an outlier while eliminating the influence of outliers that are independently included in values of each explanatory variable of an unknown case of the unknown case set, thereby providing a highly-accurate prediction result.

(3) System Configuration and the Like

Among the respective processes described in the embodiments, all or a part of the processes described as being processed automatically can be performed manually (for example, the probability can be determined, rather than by automatic calculation, by a user by referring to a similar case table for each unknown case), or all or a part of the processes in the embodiments described as being performed manually can be processed automatically using a known method. In addition, the process procedures, specific names, information (such as "k", which is the number of known cases to be retrieved as the similar cases) including various data and parameters indicated in the descriptions and drawings can be arbitrarily changed as necessary unless otherwise specified.

The respective constituent elements of the respective devices shown in the drawings are functionally conceptual, and physically the same configuration is not always necessary. That is, the specific mode (for example, the mode in FIG. 9) of distribution and integration of the devices is not limited to the shown ones, and all or a part thereof can be functionally or physically distributed or integrated in an optional unit, such as an integration of the known-case-set-statistic calculating unit 31*c* and the unknown-case-set-statistic calculating unit 31*d*, according to various kinds of load and the status of use.

All or an optional part of various process functions performed by the respective devices can be realized by a central processing unit (CPU) or a program analyzed and executed by the CPU, or can be realized as hardware by the wired logic.

(4) Scale Calculation Program

Figure 13:
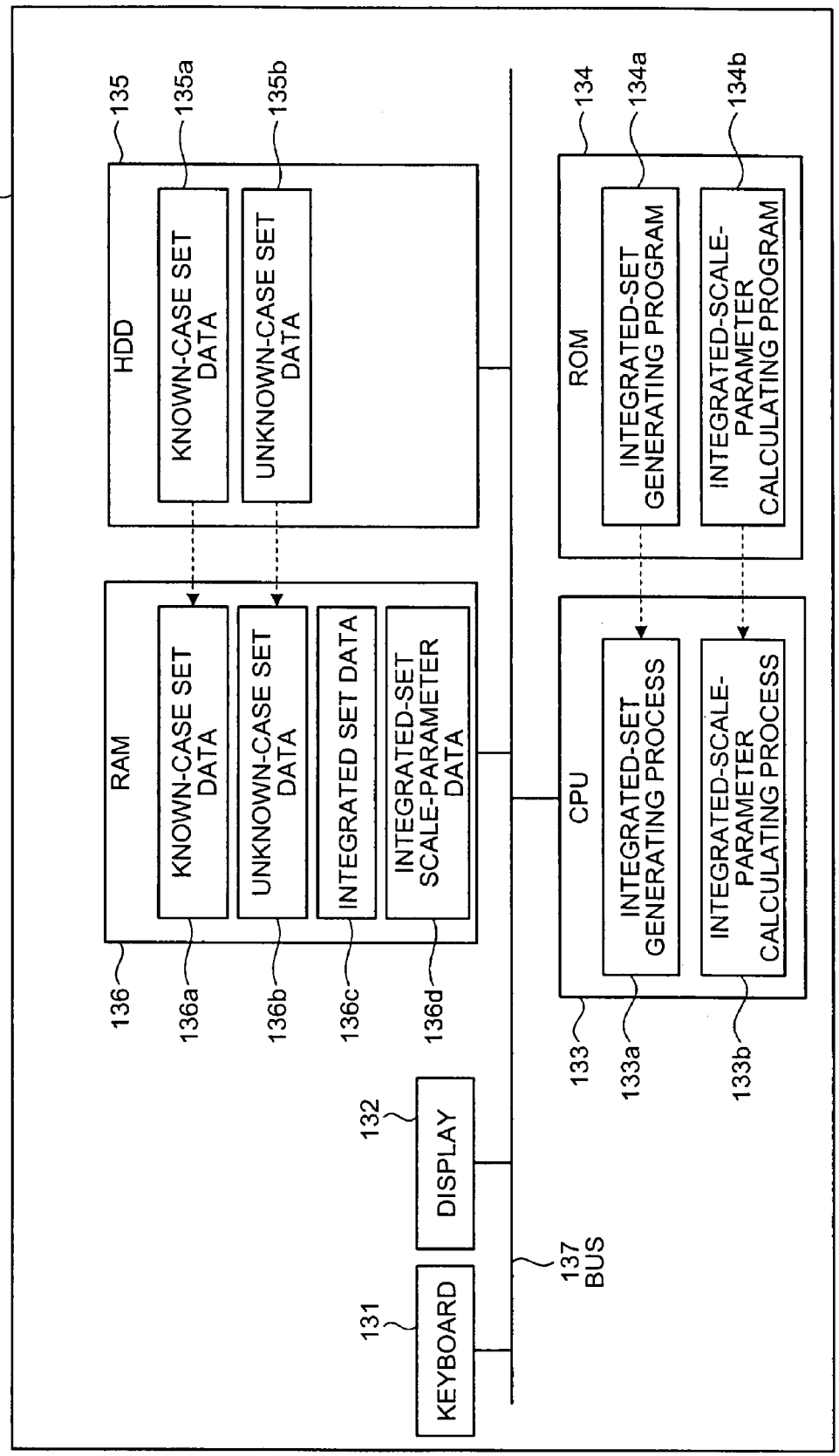
FIG. 13 depicts a computer that executes a scale-parameter calculating program according to the first embodiment.

While each of the first to fourth embodiments has described the example of implementing various processes by a hardware logic, the present invention is not limited thereto, and the processes can be implemented such that a computer executes a previously-prepared program. An example in which computer that performs a scale-parameter calculating program having the same function as that of the scale-parameter calculating apparatus 100 described in the first embodiment will be described below with reference to FIG. 13. FIG. 13 depicts the computer that executes the scale-parameter calculating program according to the first embodiment.

As shown in FIG. 13, a computer 130 as an information processor is formed by connecting a keyboard 131, a display 132, a CPU 133, read only memory (ROM) 134, a hard disk drive (HDD) 135, and random access memory (RAM) 136 with a bus 137 or the like.

The ROM 134 stores scale-parameter calculating programs; that is, as shown in FIG. 13, an integrated-set generating program 134a and an integrated-scale-parameter calculating program 134b. The programs provide the same function as that of the scale-parameter calculating apparatus 100 according to the first embodiment. The programs 134a and 134b can be integrated or distributed as required as in the case of the units of the scale-parameter calculating apparatus 100 shown in FIG. 6.

The CPU 133 reads the programs 134a and 134b from the ROM 134 and executes the programs. Hence, the programs 134a and 134b function as an integrated-set generating process 133a and an integrated-scale-parameter calculating process 133b. The processes 133a and 133b correspond to the integrated-set generating unit 31a and the integrated-set-scale-parameter calculating unit 31b shown in FIG. 6, respectively.

The HDD 135 contains a known-case set data 135a and an unknown-case set data 135b as shown in FIG. 13. The CPU 133 registers the known-case set data 135a for a known-case set data 136a and the unknown-case set data 135b for unknown-case set data 136b, reads the known-case set data 136a and the unknown-case set data 136b, and stores the data in the RAM 136. The CPU 133 executes the scale-parameter calculating process based on the known-case set data 136a and the unknown-case set data 136b stored in the RAM 136. The CPU 133 performs the scale-parameter calculating process while also utilizing integrated set data 136c and integrated-set scale-parameter data 136d stored in the RAM 136. The data 136c and 136d are data generated during the scale-parameter calculating process.

The programs 134a and 134b are not necessarily stored in the ROM 134 in advance. Alternatively, the programs can be stored in a portable physical media, a fixed physical media, or another computer (or a server) connected to the computer 130 via a public line, the internet, a local-area network (LAN), or a wide area network (WAN) such that the computer 130 reads the programs for execution. Examples of the portable physical media include a flexible disk (FD), a CD-ROM, a magneto optical (MO) disk, a digital versatile disc (DVD), a magnetic optical disk, and an integrated circuit (IC) card, to be inserted into the computer 130. Examples of the fixed physical media include an HDD provided inside or outside of the computer 130.

According to an aspect of the present invention, the scale parameter that is more adapted to an unknown case having an outlier among its explanatory variable values than a scale parameter calculated only from the known case set is obtained. Hence, a highly-accurate prediction result can be provided.

According to another aspect of the present invention, the scale parameter that is more adapted to an unknown case having an outlier among its explanatory variable values than a scale parameter obtained as the difference between a maximum explanatory-variable value and a minimum explanatory-variable value of the known case set is obtained. Hence, a highly-accurate prediction result can be provided.

According to still another aspect of the present invention, the scale parameter that is more adapted to an unknown case having an outlier among its explanatory variable values than a scale parameter, which is the standard deviation of the explanatory variable values of the known case set is obtained. Hence, a highly-accurate prediction result can be provided.

According to still another aspect of the present invention, the scale parameters each of which normalizes a distribution of values of each explanatory variable are obtained. Hence, a highly-accurate prediction result can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores therein a scale-parameter calculating program that causes a computer to implement a method comprising:

calculating scale parameters, each of which is for use in normalization of a distribution of values of each of explanatory variables in calculation of inter-explanatory variable distances, to predict a value of a objective variable of an unknown case by extracting one or more known cases similar to the unknown case from known cases based on inter-case distances, the inter-case distances being obtained based on the inter-explanatory distances, each of the inter-explanatory variable distances being a distance between each of the known cases and the unknown case taken for each of explanatory variables, each of the cases including the explanatory variables each expressed by a numerical value and the objective variable expressed by a character string, each of the known cases being a case that has a known objective variable value, the unknown case being a case that has an unknown objective variable value;

calculating each of the scale parameters for each of the explanatory variables of a union set combined by a known case set of the known cases and an unknown case set of the unknown case; and holding by storing the scale parameters each of which is calculated for each of the explanatory variables in the calculating, wherein an unknown case is sequentially extracted from the unknown case set as a prediction target, and the scale parameter of a union set combined by the unknown case and the known case set is calculated for each of the explanatory variables.

2. The computer program product according to claim 1, wherein a difference between a maximum value and a minimum value of the numerical values of the explanatory variable is calculated in the calculating for each of the explanatory variables of the union set combined by the known case set and the unknown case set as the scale parameter of the explanatory variable.

3. The computer program product according to claim 1, wherein a standard deviation of the numerical values of the explanatory variable is calculated in the calculating for each of the explanatory variables of the union set combined by the known case set and the unknown case set as the scale parameter of the explanatory variable.

4. The computer program product according to claim 1, wherein the scale parameter of each of the explanatory variables is calculated in the calculating such that a mean square of the inter-explanatory-variable distances taken for all combinations of the known cases of the known case set and the unknown cases of the unknown case set is a constant value for every explanatory variable.

5. The computer program product according to claim 1, wherein the scale parameter of each of the explanatory variables is calculated in the calculating such that a standard deviation of squares of the inter-explanatory-variable distances taken for all combinations of the known cases of the known case set and the unknown cases of the unknown case set is a constant value for every explanatory variable.

6. A scale-parameter calculating apparatus comprising:
a microprocessor coupled to a memory, the memory causing the microprocessor to implement a method comprising:
calculating scale parameters, each of which is for use in normalization of a distribution of values of each of explanatory variables in calculation of inter-explanatory variable distances, to predict a value of a objective variable of an unknown case by extracting one or more known cases similar to the unknown case from known cases based on inter-case distances, the inter-case distances being obtained based on the inter-explanatory distances, each of the inter-explanatory variable distances being a distance between each of the known cases and the unknown case taken for each of explanatory variables, each of the cases including the explanatory variables each expressed by a numerical value and the objective variable expressed by a character string, each of the known cases being a case that has a known objective variable value, the unknown case being a case that has an unknown objective variable value;
calculating each of the scale parameters for each of the explanatory variables of a union set combined by a known case set of the known cases and an unknown case set of the unknown case; and
holding by storing the scale parameters each of which is calculated for each of the explanatory variables in the calculating;
wherein an unknown case is sequentially extracted from the unknown case set as a prediction target, and the scale parameter of a union set combined by the unknown case and the known case set is calculated for each of the explanatory variables.

7. The apparatus according to claim 6, wherein the scale-parameter calculating unit calculates a difference between a maximum value and a minimum value of the numerical values of the explanatory variable for each of the explanatory variables of the union set combined by the known case set and the unknown case set as the scale parameter of the explanatory variable.

8. The apparatus according to claim 6, wherein the scale-parameter calculating unit calculates a standard deviation of the numerical values of the explanatory variable for each of the explanatory variables of the union set combined by the known case set and the unknown case set as the scale parameter of the explanatory variable.

9. The apparatus according to claim 6, wherein the scale-parameter calculating unit calculates the scale parameter of each of the explanatory variables such that a mean square of the inter-explanatory-variable distances taken for all combinations of the known cases of the known case set and the unknown cases of the unknown case set is a constant value for every explanatory variable.

10. The apparatus according to claim 6, wherein the scale-parameter calculating unit calculates the scale parameter of each of the explanatory variables such that a standard deviation of squares of the inter-explanatory-variable distances taken for all combinations of the known cases of the known case set and the unknown cases of the unknown case set is a constant value for every explanatory variable.

11. A scale-parameter calculating method comprising:
calculating scale parameters, each of which is for use in normalization of a distribution of values of each of explanatory variables in calculation of inter-explanatory variable distances, to predict a value of a objective variable of an unknown case by extracting one or more known cases similar to the unknown case from known cases based on inter-case distances, the inter-case distances being obtained based on the inter-explanatory distances, each of the inter-explanatory variable distances being a distance between each of the known cases and the unknown case taken for each of explanatory variables, each of the cases including the explanatory variables each expressed by a numerical value and the objective variable expressed by a character string, each of the known cases being a case that has a known objective variable value, using a microprocessor;
calculating each of the scale parameters for each of the explanatory variables of a union set combined by a known case set of the known cases and an unknown case set of the unknown case, using the microprocessor; and
holding by storing the scale parameters each of which is calculated for each of the explanatory variables in the calculating in a memory coupled to the microprocessor,
wherein an unknown case is sequentially extracted from the unknown case set as a prediction target, and the scale parameter of a union set combined by the unknown case and the known case set is calculated for each of the explanatory variables.

* * * * *